(12) United States Patent
Latham

(10) Patent No.: US 6,825,443 B2
(45) Date of Patent: Nov. 30, 2004

(54) VEHICULAR AND OUTDOOR WATER-TANK VALVE HEATING SYSTEM

(76) Inventor: William Garland Latham, 2468 Cortland Ave., Grand Jct, CO (US) 81506

( * ) Notice: Subject to any disclaimer, the term of this patent is extended or adjusted under 35 U.S.C. 154(b) by 0 days.

(21) Appl. No.: 10/397,879

(22) Filed: Mar. 26, 2003

(65) Prior Publication Data

US 2004/0018010 A1 Jan. 29, 2004

Related U.S. Application Data

(60) Provisional application No. 60/368,016, filed on Mar. 26, 2002.

(51) Int. Cl.$^7$ ................................................ B60L 1/02
(52) U.S. Cl. ...................... 219/208; 392/485; 392/496; 392/486; 219/206; 219/205; 219/201; 219/202
(58) Field of Search ................................ 219/208, 206, 219/205, 201, 202; 392/485, 486, 496

(56) References Cited

U.S. PATENT DOCUMENTS

| 4,140,150 | A | * | 2/1979 | Rundell | 137/340 |
| 4,286,617 | A | * | 9/1981 | Bedient | 137/334 |
| 4,298,021 | A | * | 11/1981 | Bozeman | 137/334 |
| 4,903,368 | A | * | 2/1990 | Duthie et al. | 15/339 |
| 5,065,471 | A | * | 11/1991 | Laplante | 15/250.04 |
| 5,522,543 | A | * | 6/1996 | Herzog | 239/1 |
| 5,911,748 | A | * | 6/1999 | Boxum | 62/244 |

* cited by examiner

Primary Examiner—Shawntina Fuqua
(74) Attorney, Agent, or Firm—Barber Legal; Craig W. Barber

(57) ABSTRACT

A vehicle or stationary liquid, water or oil tank heater teaches that a hot fluid may be passed through a metal body placed in the water piping or in the vacuum piping, thereby melting any ice in the system and preventing further freezing. The system may be advantageously used with manifolds, valves, scrubbers, pipes or the water tank itself. The coolant flow path may be optimized for ease of production and/or efficient heat transfer. The invention may be used with an external source of hot liquid, or it may be used with a cuff which may slipped over any of a variety of devices in need of de-icing.

13 Claims, 9 Drawing Sheets

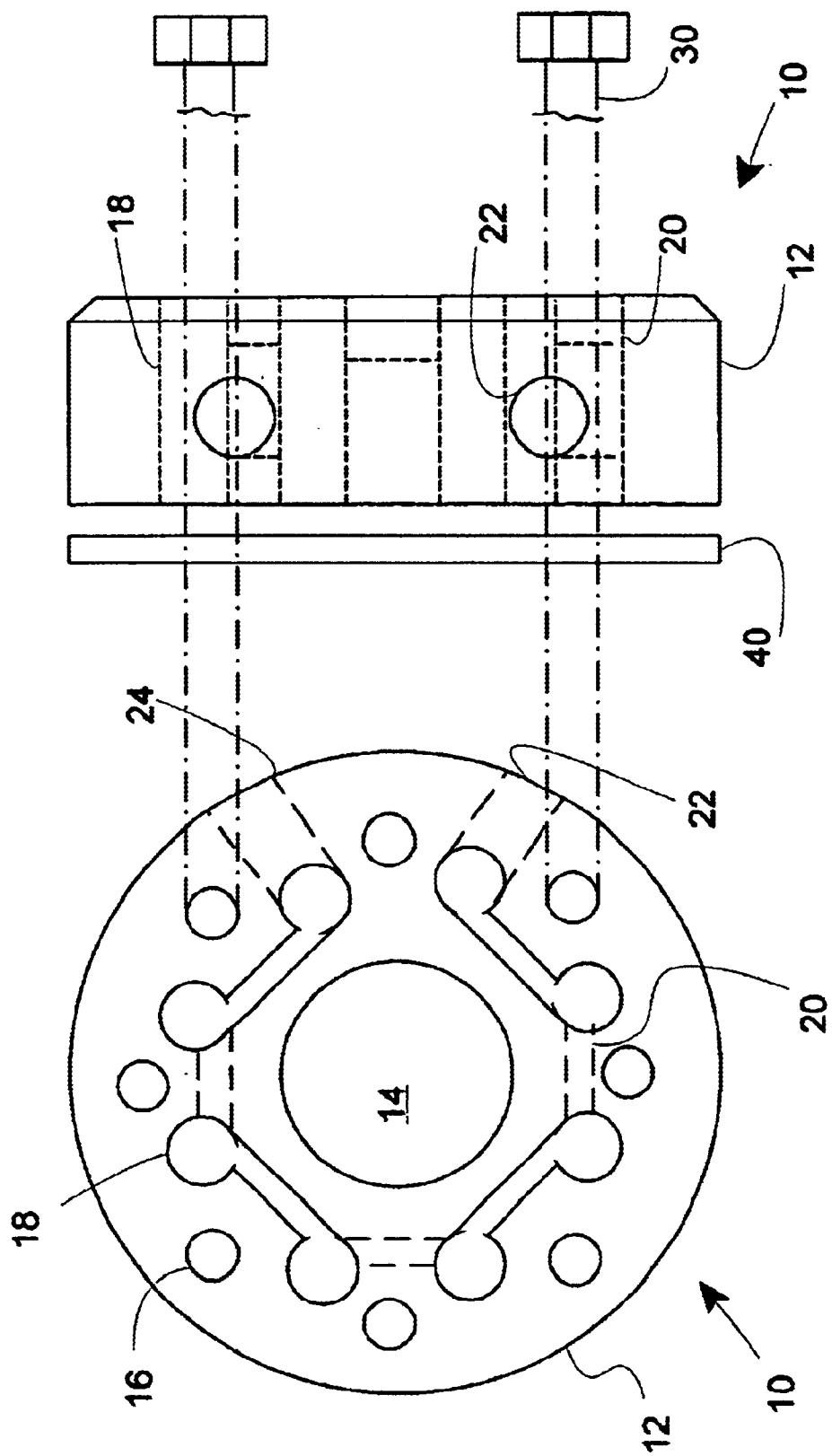

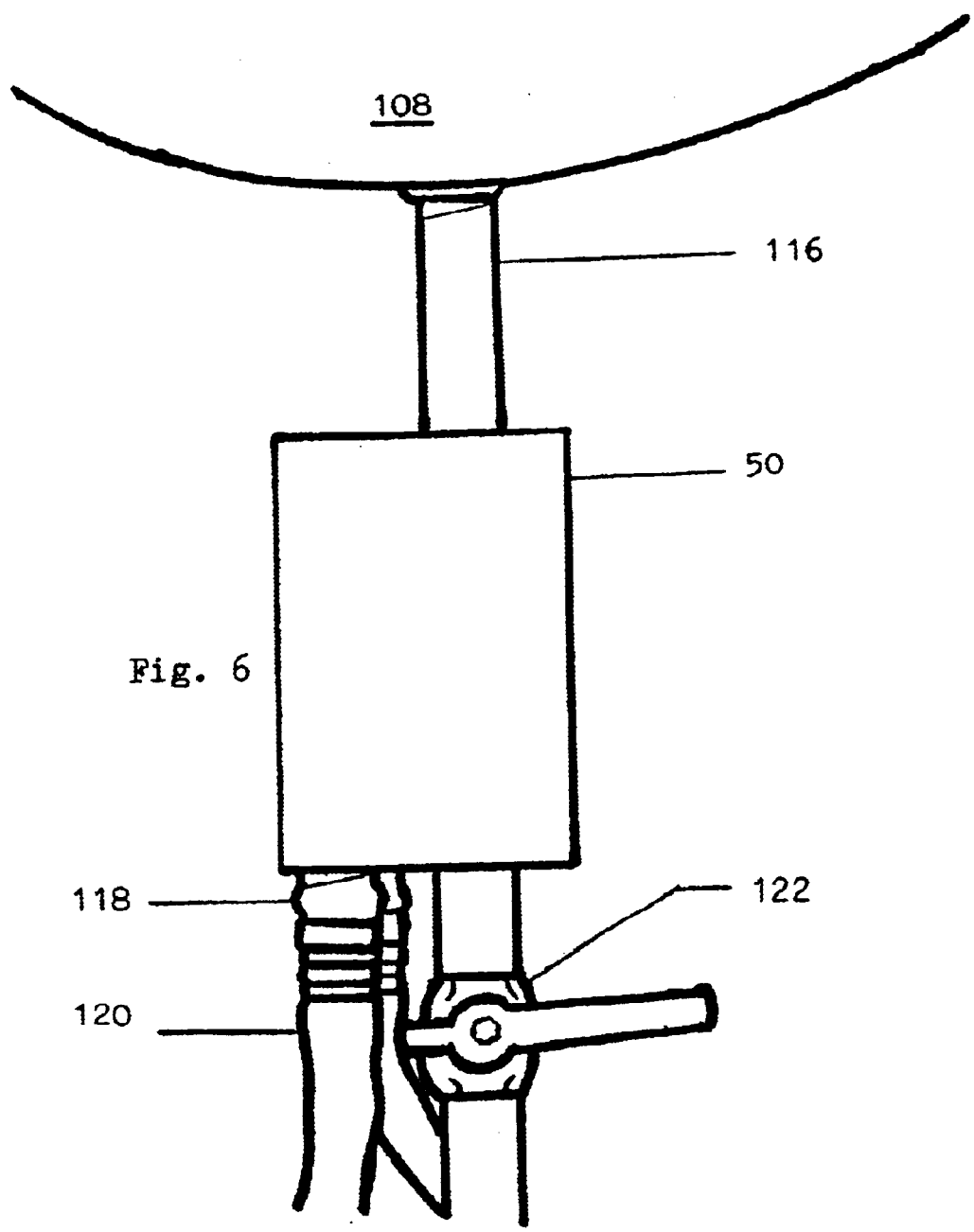

VEHICULAR AND OUTDOOR WATER-TANK VALVE HEATING SYSTEM

CROSS REFERENCE TO RELATED APPLICATIONS

This application claims the benefit of provisional application No. 60/368,016 filed in the United States Patent and Trademark Office on Mar. 26, 2002 and entitled VEHICULAR AND OUTDOOR WATER-TANK HEATING SYSTEM in the name of the same inventor, Garland Latham.

FIELD OF THE INVENTION

This invention relates to generally to vehicular and stationary liquid tanks and specifically to apparatus and methods for heating the valves of vehicular water tanks to prevent or undue freezing of such valves.

BACKGROUND OF THE INVENTION

Trucks and other vehicles carrying large water tanks suffer from cold related problems during inclement weather. One particular problem which occurs is that of valve freezing. This same problem also occurs with stationary tanks, for example "in field" oil storage tanks.

In a typical vehicle having a water tank, the water tank has an inlet/outlet valve to an outlet line and a vacuum line. The vacuum line induces a vacuum inside the tank to induce water to enter via the inlet/outlet valve. The vacuum line also pressurizes the tank to force water to exit via the inlet/outlet valve.

A vacuum tank or scrubber tank or scrubber may be employed upon the vacuum line to prevent water or evaporated moisture from the tank from reaching the pump which supplies the vacuum or increased pressure. Such a tank may simply serve as a condensate trap. However, in cold conditions the scrubber tank may itself freeze, thus reducing the efficiency of the pump or blocking the line entirely.

The water in the tank is substantially protected from freezing by its large thermal mass. In addition, tank heaters may prevent water in the tank from freezing. While tank heaters are sufficient to prevent freezing of the water in the tank, they are not sufficient to prevent freezing in the various valves, scrubber tanks and other appendages to the tank. Such appendages have relatively little mass and contain relatively little water, thus leaving them open to the certainty of swift heat loss in cold weather. The wind chill induced during vehicle motion, when operating on any parts that have become externally wet, can easily induce freezing even when the actual external temperature is above the freezing point of water. Heaters located in or on the water tank itself are not able to help prevent such freezing. It is normally not possible to entirely clean all the water from the inside of a valve, and even a modest residue is sufficient to freeze a valve (or scrubber, pipe, or other appendage) and render the vehicle inoperable until heat is applied to the affected part.

In addition, when a vehicle is parked for a night, it may suffer freezing which must be undone when the vehicle is next placed into service.

In the past, the most common method of unfreezing the valve was application of a blowtorch to the exterior of the valve to warm the metal until whatever water residue was freezing inside of the valve melted and freed the valve. This has some disadvantages, however, for example requiring trucks to carry blow torches. In addition, it is not uncommon to find a small residue of oil or other petrochemicals remaining in such a tank, even when the tank is ordinarily used to carry water. Vapors from such chemicals have in the past ignited, causing an explosion of the tank. Several accidents a year occur in this manner. Trucks hauling water, fire trucks, street sweepers, trucks going to and from oil rigs, tanker trucks for service stations or airports and numerous other types of vehicles are all plagued by this problem. Vacuum trucks, in particular, are widely used in the petroleum industry to remove and transport a wide variety of products, by-products, wastes and other liquids, including but not limited to flammable and inflammable hydrocarbons, caustics, hazardous materials, etc. Such tanks are often used to service isolated stationary tanks, for example by removal of product, or for spill recovery and material transfers. Such trucks are equipped with a further wide variety of equipment, accessories, and systems to prevent or minimize liquid carryover into the vacuum pump during loading or off-loading. These include filters, baffles, deflectors, swash plates, moisture traps or scrubbers, cyclones, screens, baskets, bags and cartridges, internal and secondary shut-offs, multiple routings, scrubber drain valves, isolation valves, bleeder valves, manifold/inlet/outlet valves and external scrubbers. Such trucks are often protected from over-pressure by relief valves or rupture discs such as pop-offs.

The same problems occur with stationary tanks.

A need exists to prevent vehicular water tank valves, scrubber tanks and lines from freezing, and to undue such freezing when it occurs.

SUMMARY OF THE INVENTION

General Summary

The present invention teaches the use of vehicle engine coolant circulated through couplings, sleeves or similar fittings which are utilized at the locations where freezing is likely to occur.

In one embodiment, the invention teaches a manifold heater built to mate with pipe flanges holding between them an ordinary valve.

In an alternative embodiment, the invention teaches a scrubber heater meant to serve as a short section of vacuum line/drain line positioned just beneath the scrubber so as to warm the air entering the scrubber and the scrubber itself as well.

In an alternative embodiment, the invention teaches a quick disconnect cuff for unfreezing valves, pipes or accessories other than those on the vehicle or stationary tank equipped with the invention.

Summary in Specific Reference to the Claims

It is therefore one aspect, advantage, embodiment and objective of the present invention to provide a water tank valve heater for use upon a water cooled vehicle engine, the heater comprising: 1) a first coolant line having first and second ends, the first end being operatively connected to such vehicle engine by which means coolant may pass between such vehicle engine and such first coolant line; 2) a second coolant line having third and fourth ends, the fourth end being operatively connected to such vehicle engine by which means coolant may pass between such vehicle engine and such second coolant line; 3) a heater body disposed at such valve, 4) the heater body having a coolant conduit therethrough, the coolant conduit having an inlet and an outlet in operative connection with each other, the second end and third end being operatively connected to such heater body respectively at the inlet and outlet, by which means coolant may pass between the first and second coolant lines.

It is therefore another aspect, advantage, embodiment and objective of the present invention to provide a heater wherein the heater body is disposed at such valve by being secured to a pipe entering such valve adjacent to the valve.

It is therefore another aspect, advantage, embodiment and objective of the present invention to provide a heater wherein the heater body is disposed at such valve by being secured directly to such valve.

It is therefore another aspect, advantage, embodiment and objective of the present invention to provide a heater wherein the coolant conduit is serpentine.

It is therefore another aspect, advantage, embodiment and objective of the present invention to provide a heater wherein the coolant conduit widens within the heater body to from a cavity.

It is therefore another aspect, advantage, embodiment and objective of the present invention to provide a heater wherein the coolant conduit divides shortly after entrance of coolant into the heater body, and reunites shortly before exit of the coolant from the healer body.

It is therefore another aspect, advantage, embodiment and objective of the present invention to provide a heater further comprising: 5) first and second couplings at the second and third ends of the coolant lines, the first and second couplings being dimensioned and configured to operatively connect respectively to the inlet and outlet.

It is therefore another aspect, advantage, embodiment and objective of the present invention to provide a heater further comprising: 6) a bypass valve having first and second positions, the first position allowing flow of coolant directly from the second end to the third end, the second position preventing flow of coolant directly from the second end to the third end.

It is therefore another aspect, advantage, embodiment and objective of the present invention to provide a heater wherein the material of the heater is one member selected from the group consisting of: steel, aluminum, polymer, and combinations thereof.

It is therefore another aspect, advantage, embodiment and objective of the present invention to provide a heater further comprising: 7) disposed on the surface of the conduit a coolant resistant material comprising one member selected from the group consisting of: a sleeve, an insert, a coating, a treated portion of the heater body, and combinations thereof.

It is therefore another aspect, advantage, embodiment and objective of the present invention to provide a heater used on a generally cylindrical valve, wherein: 8) the heater body is generally cylindrical and hollow, having a diameter greater than such cylindrical valve, 9) the heater body being disposed about the cylindrical valve, and 10) each end of the heater body is closed by means of a generally circular plate having a hole through which the generally cylindrical valve passes, wherein the hole is the same shape and dimension as the exterior surface of the generally cylindrical valve.

It is therefore another aspect, advantage, embodiment and objective of the present invention to provide a water tank scrubber heater for use upon a water cooled vehicle engine, the heater comprising: 1) a first coolant line having first and second ends, the first end being operatively connected to such vehicle engine by which means coolant may pass between such vehicle engine and such first coolant line; 2) a second coolant line having third and fourth ends, the fourth end being operatively connected to such vehicle engine by which means coolant may pass between such vehicle engine and such second coolant line; 3) a heater body disposed at such scrubber, 4) the heater body having a coolant conduit therethrough, the coolant conduit having an inlet and an outlet in operative connection with each other, the second end and third end being operatively connected to such heater body respectively at the inlet and outlet, by which means coolant may pass between the first and second coolant lines.

It is therefore another aspect, advantage, embodiment and objective of the present invention to provide a method of thawing frozen water valves on water tank vehicles and water tanks served by vehicles, the method comprising the steps of: 1) heating engine coolant in an engine, 2) passing the coolant through a heater body disposed upon a water valve.

DESCRIPTION OF THE DRAWINGS

FIG. 1 is a plan view of a valve heater according to a first embodiment of the invention.

FIG. 2 is a side view of the valve heater of the first embodiment, showing also partial cut away side views of two retaining bolts and an intermediate pipe flange.

FIG. 6 is a side view of the second embodiment of the invention showing the unit in place.

DETAILED DESCRIPTION

Liquid cooled vehicular engines normally produce a circulating flow of hot coolant. The coolant normally passes through the channels of the engine block's coolant jacket, picking up heat from the engine, then exit the engine block via either a thermostatic valve which opens when the coolant reaches a prescribed temperature, or via special valves such as those used in certain embodiments of the invention. As the engine normally runs at a quite high temperature, the temperature of the coolant is normally quite high. Typical vehicular coolants may be at Fahrenheit temperatures of 160, 180 or 200 degrees. The hot coolant dissipates its heat in a radiator and returns to the engine block at a lower temperature. Coolant lines carry the coolant during its circulation. In those embodiments of the invention in which the coolant exits the block via valves other than thermostat, the heaters of the present invention tend to heat in synchronization with the warming engine, rather than waiting until the thermostat opens.

The present invention teaches that the heat from the coolant may be advantageously used to prevent freezing of water tank valves, scrubbers and other attachments to vehicular or even stationary water, oil or other liquid tanks.

In addition to this general method, the present invention teaches specific structures for prevention of freezing of water valves and/or de-icing of frozen valves, and specific structures for carrying out the same tasks on other water tank accessories such as scrubbers.

FIG. 1 is a plan view of a valve heater according to a first embodiment of the invention. Valve heater 10 (also referred to as a manifold heater) has generally cylindrical body 12 composed of an appropriate material such as steel, 6061 aluminum stock, etc. Aperture 14 is coaxial to body 12 and passes through from one side to the other.

Figure 5:
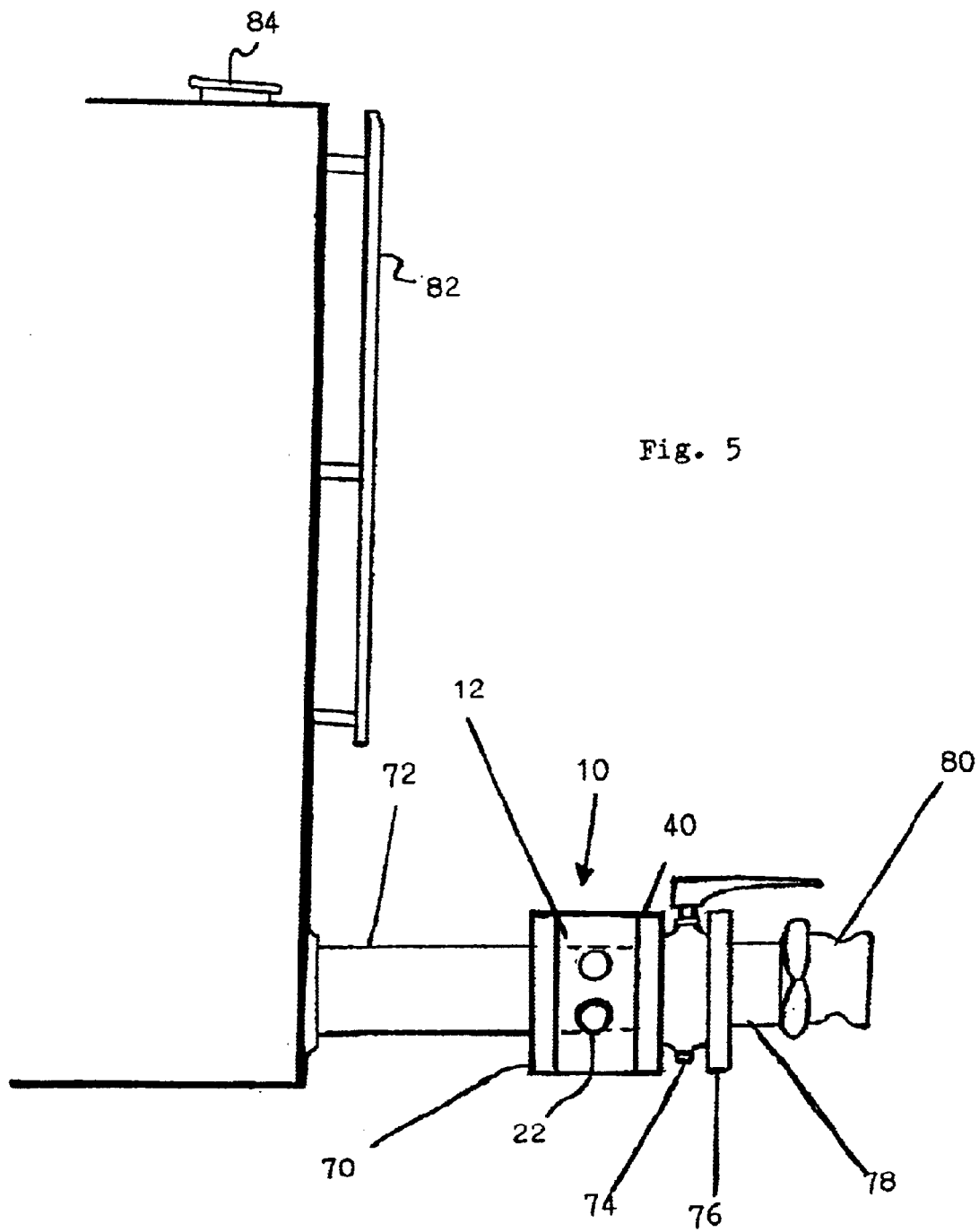
FIG. 5 is a side view of a manifold/valve heater according to the first embodiment of the invention, but mounted upon a stationary liquid tank. This embodiment shows that the heater ports may be hooked up to an external (vehicle mounted) heat source.

FIG. 5 is a side view of a manifold/valve heater according to the first embodiment of the invention, but mounted upon a stationary liquid tank. This embodiment shows that the heater ports 22 may be hooked up to an external (for example, vehicle mounted) heat source. Stationary tank 100 has ladder 82 and hatch 84. This tank may be any size and hold any liquid, even liquids which do not customarily freeze, as water or other conditions may freeze a valve regardless of the liquid content of tank 100. For example, tank 100 may be a standard 400 barrel oil tank. Manifold (inlet/outlet pipe) 72 has flange 70 which mates with body 12 of valve heater 10 by means of fasteners (not shown). Intermediate flange 40 sits between body 12 and valve 74, flange 76 then connect to nipple 78 and cam lock fitting 80 which in turn serve to connect tank 100 to any sources of liquids such as pipelines, well heads, tanker trucks, etc.

When mounted upon a stationary tank, the embodiment depicted does not have any coolant hoses. When use of the valve heater is required, port 22 may be hooked up to coolant lines from a truck engine, that is the truck engine will serve as the source of the hot coolant. In an alternative embodiment, the stationary tank may have its own source of heat to supply hot liquid (technically not a coolant unless used to cool something other than the valve) with which to operate the invention.

In general, the valve of a vehicular water tank may be thought of as being positioned between two sections of pipe. A first section (manifold 72) runs from the valve to the water tank, a second section (nipple 78) runs from the valve to the final water outlet. The pipes are normally coaxial and abut, the abutting faces of the two pipes have flanges 70, 76 of a diameter greater than the outer diameter of the pipes. A typical valve 74 sits in between the abutting flange faces. Such a valve may be a butterfly valve or other type of valve.

FIGS. 1 and 2 show valve heater 10 in greater detail. The first embodiment of the present invention also sits between the flanges of the two pipes, coaxial therewith. Aperture 14 may advantageously be the same inner diameter as the two pipes while body 12 may advantageously be the same outer diameter as the flanges of the two pipes. Thus water flowing through the pipes from outlet/cam lock fitting 80 to tank 100 or from tank 100 to outlet/com lock fitting 80 will pass through the pipes, the valve and valve heater 10. Body 12 may be machine faced so as to provide the desired degree of fit.

Example bolt holes 16 allow bolts to align and secure the flanges, valve and valve heater 10 together. While 6 bolt holes are shown, other arrangements and numbers of bolt holes are possible. In addition, other fastenings may be used in place of bolts and bolt holes without departing from the scope of the present invention.

Example passage 18 holds coolant, as do other passages penetrating longitudinally through body 12. Example surface channel 20 connects the passages at the back face of body 12. The surface channels are open at the face of body 12. Other surface channels connect each of the passages so that the network of surface channels and passages combine to form a three dimensionally serpentine coolant path which penetrates throughout body 12 and furthermore which open out to allow coolant to contact the surfaces of other bodies abutting body 12. As stated previously, the components of the system may be machine faced for better fit.

Also as stated previously, valve heater 10 is placed coaxially in the sequence of pipes and valves which comprise the outlet/inlet of the vehicular water tank. FIG. 2 is a side view of the valve heater of the first embodiment, showing also partial cut away side views of two retaining bolts and an intermediate pipe flange. Intermediate flange 40 sits between the valve (not shown) and valve heater 10. Bolt 30 penetrates though the flange of the water pipe on one side (not shown), though body 12 of valve heater 10 by way of bolt holes such as example bolt hole 16, through intermediate flange 40, and through or past the butterfly valve (not shown) and the opposing flange on the opposing water pipe on the second side of the valve, intermediate flange and valve heater assembly. Thus, the flanges on each side of body 12 provide the "missing" sides of surface channel 20 and other surface channels, preventing coolant loss. In operation, coolant flows into body 12 via inlet port 22 and passes sequentially through the various surface channels and passages therein before departing via exhaust port 24. Since the coolant is at a high temperature such as 180 degrees Fahrenheit, the result is to warm the flanges (which contact the coolant directly at the surface channels), and further to warm body 12 and the water passing therethrough. As intermediate flange 40 warms, it further warms butterfly valve 74, melting any ice present and preventing the valve from freezing.

In general, a vacuum line runs from many types of vehicular or stationary water tanks to a pump which provides low or high pressure used to bring water into or expel water from the water tank via the valve located elsewhere. Thus, the vacuum line is often an entirely separate line located elsewhere on the tank than the outlet: any pressure or suction generated will apply throughout the tank in any case, so co-location of the pump and inlet/outlet valve is not necessary.

A scrubber tank may sit on such a vacuum line to prevent water from entering the pump line. However, condensate in the scrubber tank may freeze in cold weather, degrading the performance of the tank and eventually even blocking the vacuum line.

Figure 3:
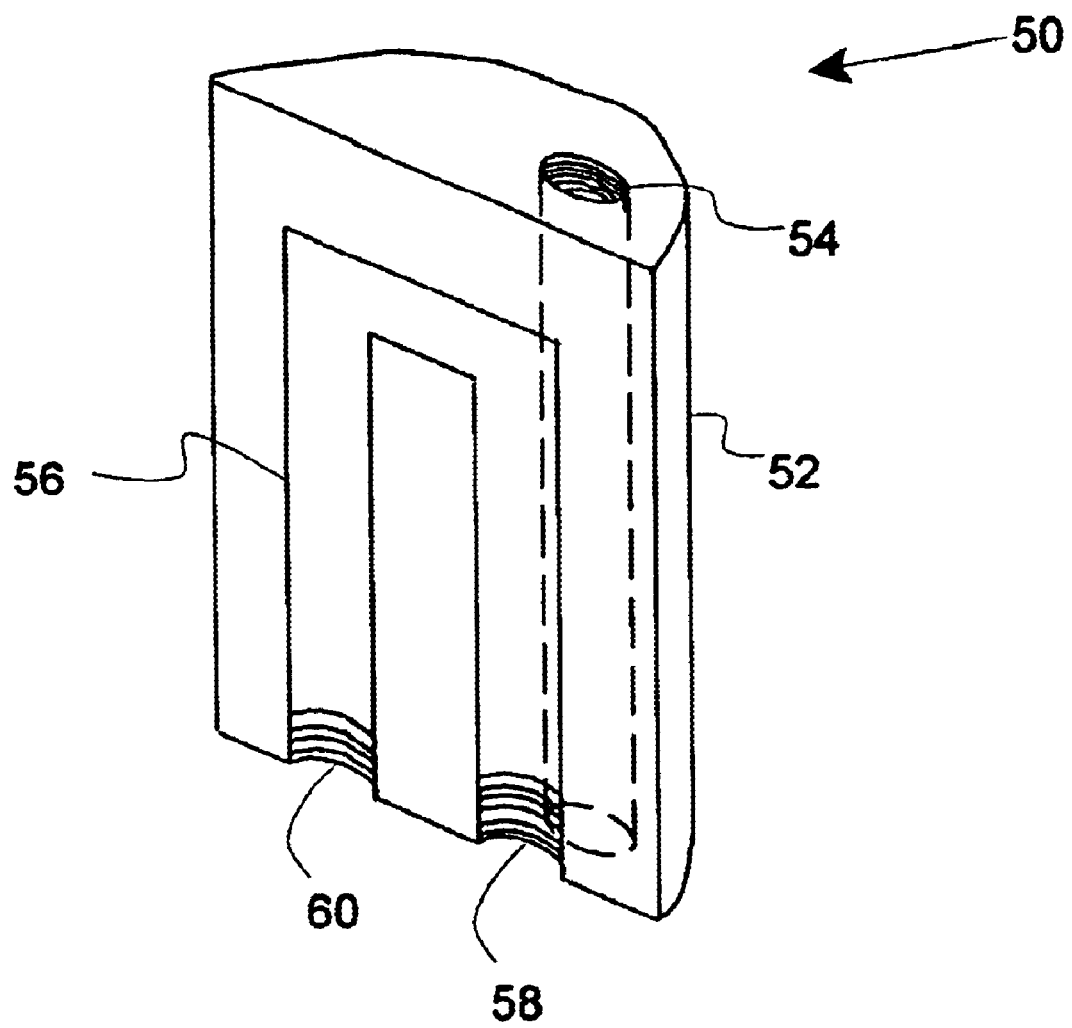
FIG. 3 is a cross sectional perspective view of a second embodiment of the invention, a scrubber heater.

As shown in FIG. 6 and FIG. 3, scrubber heater 50 sits just beneath such scrubber tank 108. Scrubber body 52 is generally cylindrical and functions as a short section of the drain line/vacuum line itself, having vacuum passage 54 which connects at the upper end to either scrubber tank 108 or pipe section 116 and at the lower end to the vacuum line running from the water tank or to valve 122. Coolant path 56 is in the second embodiment considerably simpler than the coolant path in the first embodiment, however the same basic principle applies. Coolant enters via entrance port 58, which may be threaded or have other fasteners such as hose barb 118 (a second hose barb is not fully visible in FIG. 6) to allow easy connection to conventional coolant line 120. Coolant exits via exhaust port 60. The hot coolant from the engine will function to warm body 52, thus warming both the scrubber tank above and the air and moisture passing through passage 54.

The various embodiments of the invention may be advantageously combined to create a heating system for the valves and other attachments to a vehicular water tank. In the presently preferred embodiment and best mode presently contemplated for carrying out the invention, both a scrubber heater and a valve heater are employed.

Figure 4:
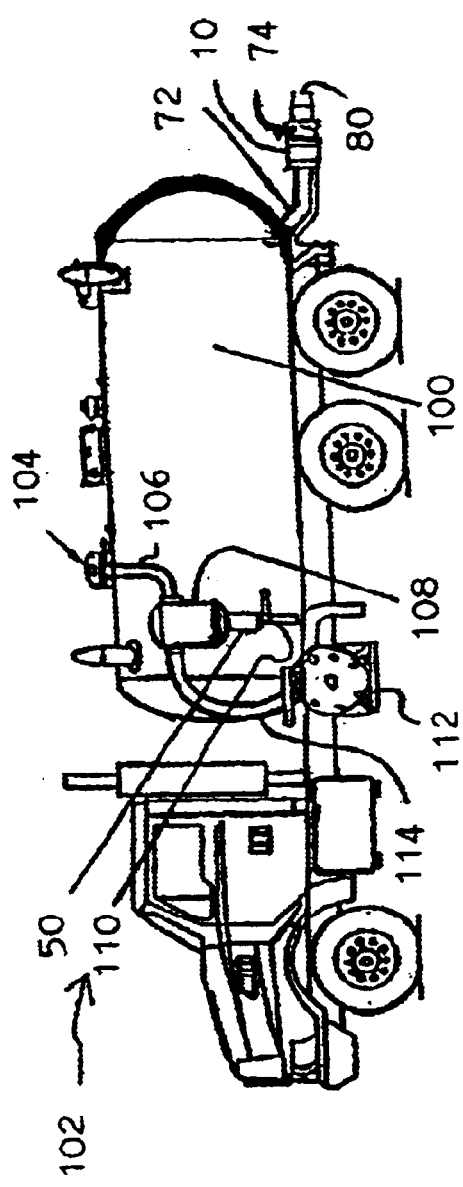
FIG. 4 is a side view of a water tank truck, showing a system-type third embodiment of the invention.

FIG. 4 shows one such system 102 used with vehicular water tank 100. Hot coolant enters the system from a coolant port on the head of the power plant or vehicle engine (not shown) and then travels through ¾ inch or 1 inch heater hoses (not shown) to valve heater 10. The fluid enters valve heater 10 via inlet port 22, and passes throughout body 12, heating the entire valve assembly 74 (and/or manifold 72 and/or outlet 80 of FIG. 5) and then departing via exhaust port 24.

After the coolant leaves valve heater 10, it travels to scrubber heater 50 via more coolant hoses. Hot coolant enters body 52 via inlet port 58, travels via coolant path 56 and exits via exhaust port 60. By this means both valve 122 and drain 110 from scrubber 108 may be warmed. In addition, scrubber 108, pressure line 106, pop-off system 104, pressure line 114 and pump 112 may also be maintained free of frozen condensate. In the case of pop-off system 104, this is an important safety feature. The coolant then returns to the normal flow path of the engine, for example to the vehicle radiator.

Figure 7:
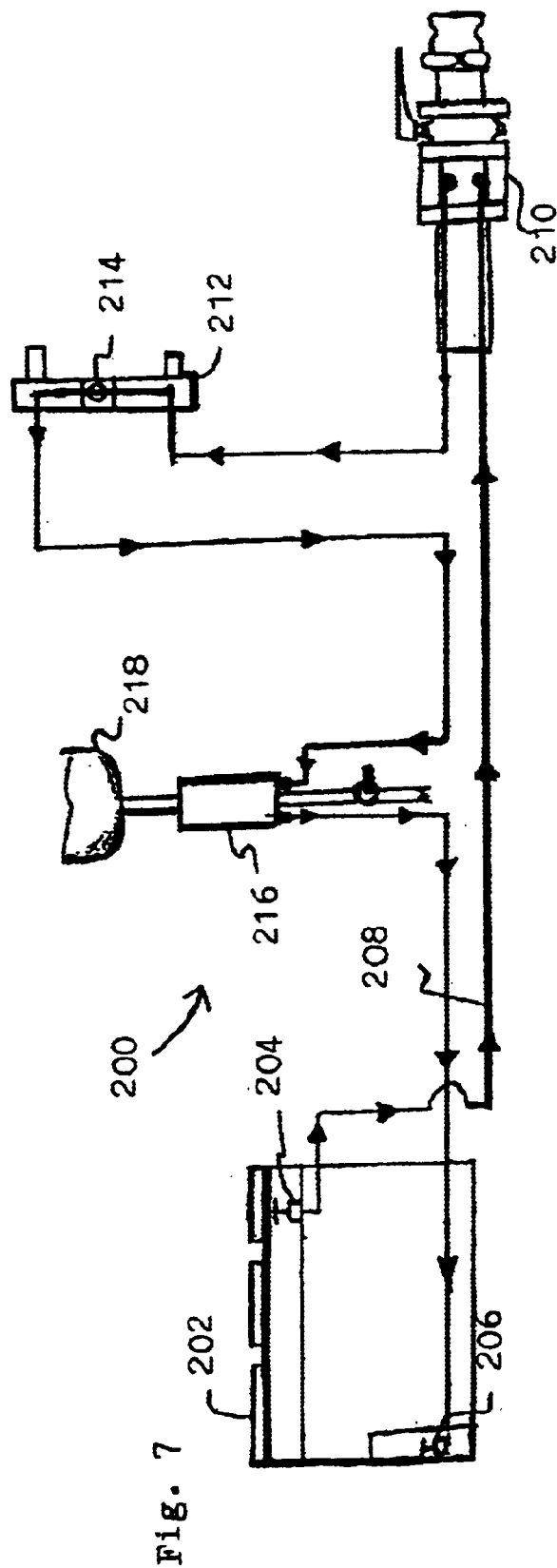
FIG. 7 is a schematic block diagram of the system-type fourth embodiment of the invention.

In alternative embodiments of the invention, other tank attachments and even the water tank itself may receive heat from the engine coolant. One such embodiment is shown in FIG. 7, in which system 200 is shown in addition to engine 202. While coolant may advantageously be removed from engine 202 via normal ports such as the thermostat valve or the coolant return line, in the embodiment shown, valves 204 and 206 may also be used for this purpose. There is a major advantage to special valves 204 and 206, that is, it is not necessary to warm engine 202 before being able to receive hot coolant from it. Valves 204 and 206 may advantageously be positioned at the top rear and bottom front of engine 202, but other placements are possible within the scope of the invention.

Coolant lines 208 take coolant first to valve heater/ manifold heater 210, thence to quick release heater cuff 212. Heater cuff 212 may fit over pipes, valves, accessories or other devices external to the vehicle, or may be used to warm sections of the liquid transport system on the truck itself which for any of a variety of reasons may not have dedicated heaters such as valve heater 210 or scrubber heater 216. As an example, stationary tank 100 might not need to be equipped with manifold heater 10 if the trucks which service it are equipped with system 200 having quick release heater cuff 212. Valve 214 is used to shut off flow within heater cuff 212. Scrubber heater 216 next receives coolant, aiding in keeping scrubber 218 free of frozen condensate, then the coolant returns to engine 202 via valve 206.

Figure 8:
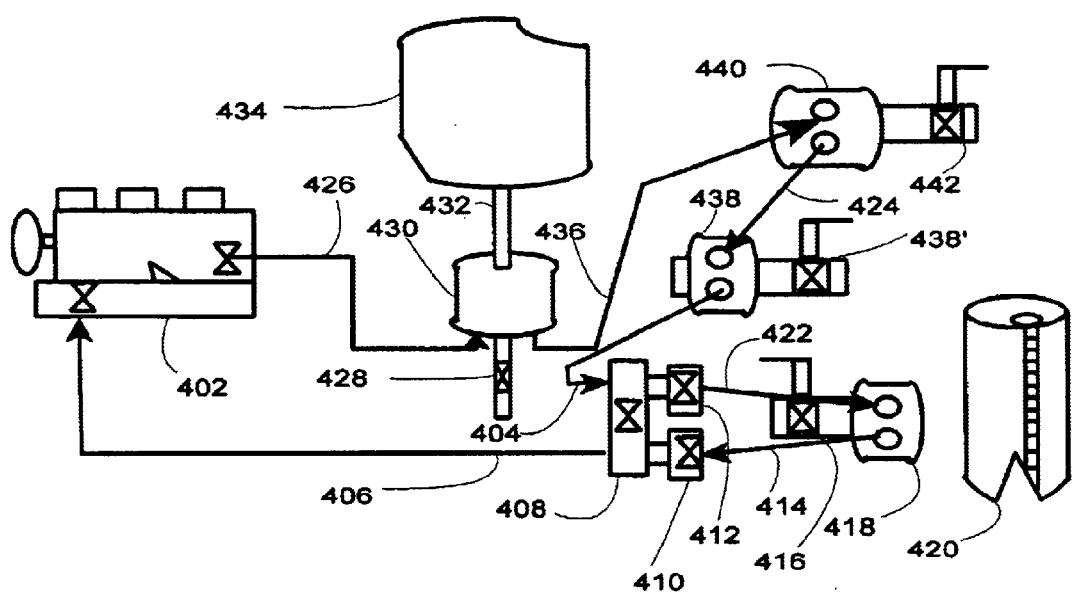
FIG. 8 is a schematic block diagram of system-type fifth embodiment of the invention.

In another alternative embodiment of the invention, a power unit may be used to heat a special liquid used for this function, rather than using the vehicle engine and engine coolant. Such a power unit may be stationary or mobile. As depicted in FIG. 5, the invention may be used in a location having no self contained heat source merely by connecting coolant hoses to ports 22. On the other hand, as shown in FIG. 7, the invention may include a quick release heater cuff 212 on the end of flexible coolant hoses, thus allowing the cuff to be slipped over/around any frozen device. As shown in FIG. 8, the complete cooling system comprise a number of elements beyond one scrubber heater and one valve heater. Engine 402 sends hot coolant down coolant line 426 to scrubber heater 430 mounted on drain line 432 of scrubber 434. Note that in the embodiment of FIG. 4, the scrubber came after the valve heater. Thus the order in which different components of the system are reached by coolant (coolant flow direction) may be altered in embodiments. Line 436 carries coolant to valve heater 440 mounted at valve 442, allowing thawing action of that valve. Thereafter, line 424 carries the coolant to valve heater 438 at valve 438'. In this case, it may be seen that the invention may be used with more than one heater/valve of a given type. In other embodiments, more than two valves may be heated, and in yet other embodiments, more than one scrubber may be heated.

Line 404 carries coolant to triple valve body 408 (a quick disconnect manifold). As discussed previously (in reference to FIG. 5 and FIG. 7), the coolant system of the truck may be diverted to thawing of a valve heater mounted upon a field tank. This may be accomplished by triple valve body 408 in a way similar to that discussed previously in relation to cuff 202. Triple valve body 408 has a bypass valve located internally (un-numbered) which may convey coolant past valve body 408 directly to line 406 when in a first position. In a second position, the internal bypass valve is closed, so coolant must exit via exit valve 412 to line 422, by which means it is carried to valve heater 418 mounted upon field tank 420 and field tank valve 416. Thereafter, line 414 carries coolant back to re-enter the truck mounted portion of the system via entrance valve 410. Exit valve 412 and entrance valve 410 may be equipped with coupling devices such as couplings, cuffs, quick releases, threaded collars and so on. From valve 410, coolant may transfer via line 406 to return to engine 402.

Figure 9:
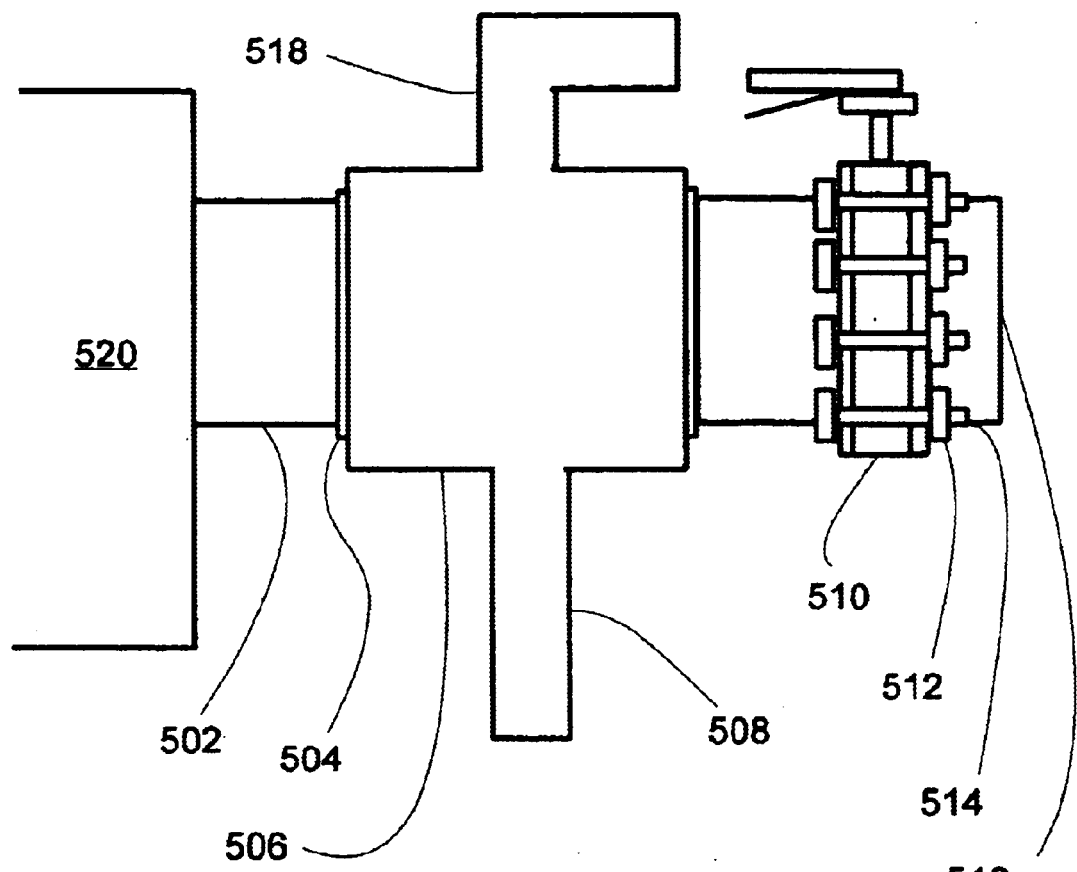
FIG. 9 is a side view of a sixth embodiment of the invention in use on a field tank.

FIG. 9 is a side view of a sixth embodiment of the invention in use on a field tank or truck tank. Field tank 520 is customarily cited "in the field", at a construction cite, storage facility, tank farm, depot, or a similar location which may become quite cold due to climatic conditions. Pipe 502 has weld 504 connecting it to valve heater body 506. Thus it may be seen that while in the preferred embodiments bolts and nuts are used to attach the inventions to manifolds, pipes, scrubbers and valve bodies, other attachments may be used in alternative embodiments. Entrance port body 518 and exit port body 508 may connect via coolant lines to a truck coolant system as discussed previously. Valve 510 is heated by conduction of heat as it is transferred down pipe 502 from heater 506. Bolt 512 and nut 514 may bused to hold valve 510 on pipe 502, and to hold outlet 516 onto valve 510.

Figure 10:
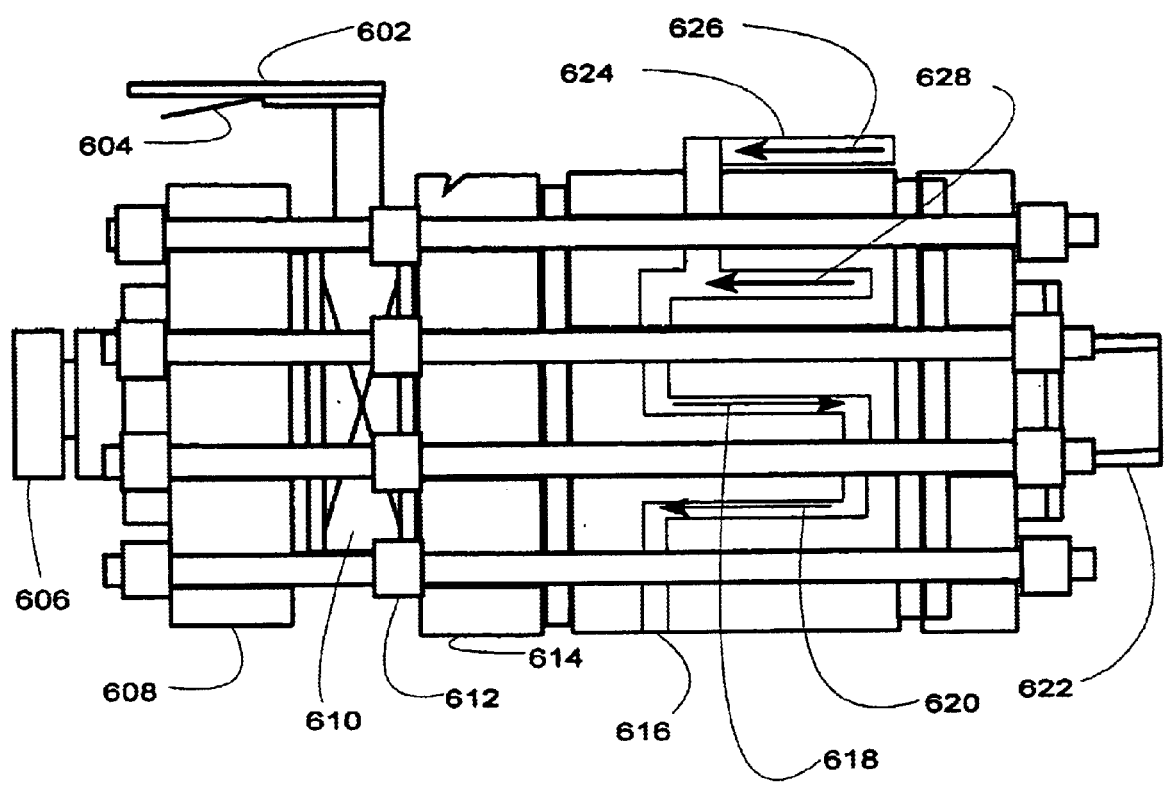
FIG. 10 is a partially cut away and partially schematic side view of a seventh embodiment of the invention in use.

FIG. 10 is a partially cut away and partially schematic side view of a seventh embodiment of the invention in use. Valve handle 602 has latch 604 used to prevent unwanted rotation. Valve 610 is shown schematically. Water intake 606 and face flange 608 are attached to valve 610 by means of bolt 612. Heater body 614 sits on pipe 622.

Note that in one preferred embodiment, serpentine channels wrap 360 degrees around the circumference of pipe 622. Not visible is another set of serpentine coolant conduits which divide from the visible coolant conduit shortly after entrance of the coolant to the heater body and then pass across the hidden side of pipe 622, before reuniting shortly before exit of the coolant from the heater body. The flow from inlet body 624 to outlet 616 is serpentine (thus increasing heat transfer to the pipe 622), as indicated by flow direction arrows 626, 628, 618 and 620. This increased coolant mass and contact time provides more efficient thawing action. In other embodiments, a single coolant conduit may pass entirely around the pipe 622 so as to provide 360 coverage. Serpentine in this context indicates that it twists and coils as it passed through the heater body.

In other embodiments, the device may simply comprise a widening of the coolant conduit so as to form a cavity within the heater body. For example, in one presently somewhat preferred embodiment of the invention, the device may simply comprise a section of ten inch diameter pipe used around a four inch diameter valve, pipe, scrubber pipe, etc. The ends of the heater body (10 inch diameter) are closed with circular plates having four inch diameter holes through which the valve or pipe passes. Sealing may be accomplished by welding or other desirable methods.

In this embodiment, as in all other embodiments, dimension of the device and valve are not limited.

Note that the invention may be generally circular or other shapes, not necessarily perfectly circular.

Figure 11:
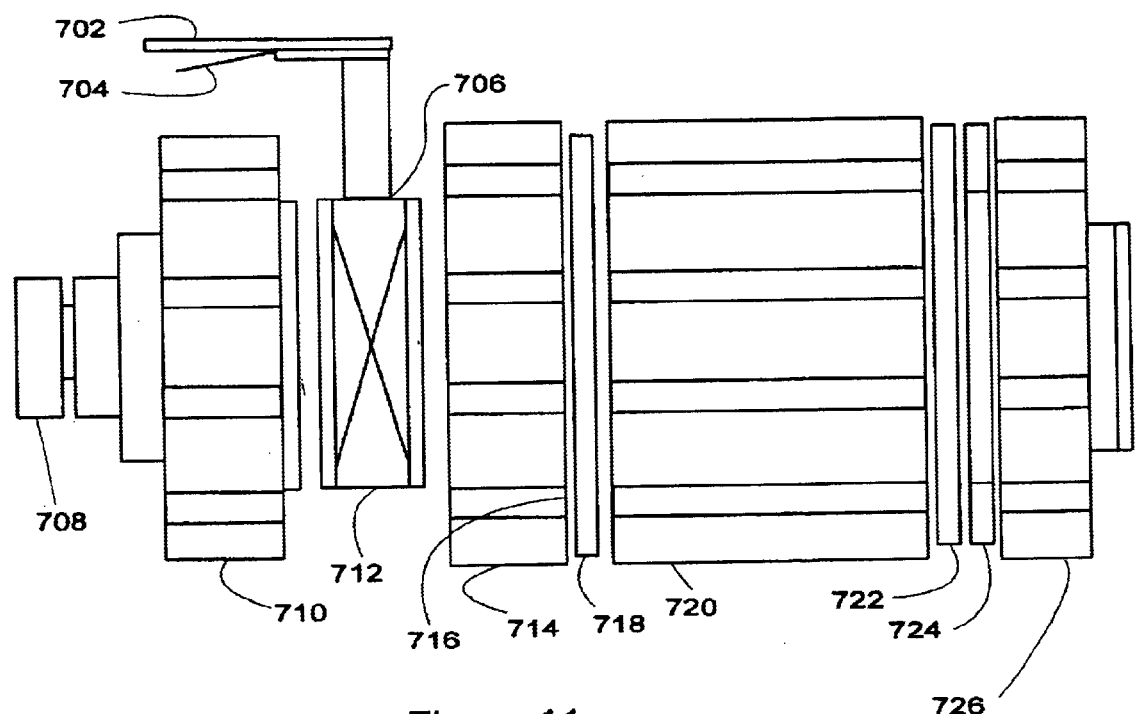
FIG. 11 is a partially cut away and partially schematic side view of an eighth embodiment of the invention in use.

FIG. 11 is a partially cut away and partially schematic side view of an eighth embodiment of the invention in use. Valve handle 702 has latch 704 used to prevent unintended or unauthorized opening or closing of valve 712 (shown schematically). Water intake 708 and face flange 710 are disposed upon one side of valve 712, while heater flange 714, first rubber gasket 718, heater body 720, second rubber gasket 722, fiber gasket 724 and raised face 726. Aperture 716 may accept bolts, rods or similar assembly devices.

Fiber gasket 724 allows compensation for the difference between fill face flanges and raised face flanges: a raised face flange may have a slight declivity, often 1/16 of an inch, which makes the flange face unsuitable for a flat connection. The fiber gasket may be used with such raised face flanges to provide a flat surface for mating the items together, or may be discarded for flat flanges.

The material used to make the invention may be any of a wide range of materials, and the exact shape and configuration of the invention may vary a good deal, especially in regard to flow paths, with may be optimized without undue experimentation. In particular, it is seen that the invention may serve as a section of pipe (as in scrubber 50) or as a unit sitting in between pipe flanges (as in valve heater 10), or in other configurations. For example, in one configuration the invention may actually be independent of the pipe system, being placed on the outside of the pipes or valves as needed. In another embodiment, there may be more than one coolant flow path in the body of the invention. In one embodiment, the invention is comprised of 6061 aluminum, machine faced. In other embodiments the invention may be stainless steel, steel, or other metals. It may also be made of polymers. In embodiments in which the material is susceptible to attack by the constituent ingredients of the engine coolant (as is well known, water, ethylene glycol, other glycols, alcohols, and similar coolant components can be very harsh on metals) protective measures may be employed. For example, a stainless steel sleeve may be employed, inserts may be employed, coatings or treatments of the portions of the heater body which comprise the interior surfaces of the coolant conduit. More than one such method may be employed.

In embodiments in which the heater has a bore for carrying water or other liquids, the bore may also be so equipped. For example, in some embodiments the heater may be a section of plumbing and may occasionally carry nitric acid, which is extremely corrosive of aluminum. Such bores, or the entire unit, may be made resistant.

The invention may further be embodied as a method in which coolant from a vehicle engine is heated in the vehicle engine and passed through a heater body disposed upon a valve, manifold, pipe, outlet, intake, or scrubber.

The invention is clearly susceptible to embodiment either as a retrofit to an existing truck or field tank, or it may be embodied in a new truck or field tank.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the claims accompanying the corresponding utility application to be filed at a later date.

What is claimed is:

1. A water tank valve heater for use upon a water cooled vehicle engine, the heater comprising:
   1) a first coolant line having first and second ends, the first end being operatively connected to such vehicle engine by which means coolant may pass between such vehicle engine and such first coolant line;
   2) a second coolant line having third and fourth ends, the fourth end being operatively connected to such vehicle engine by which means coolant may pass between such vehicle engine and such second coolant line;
   3) a heater body disposed at such valve,
   4) the heater body having a coolant conduit therethrough, the coolant conduit having an inlet and an outlet in operative connection with each other, the second end and third end being operatively connected to such heater body respectively at the inlet and outlet, by which means coolant may pass between the first and second coolant lines.

2. The heater of claim 1, wherein the heater body is disposed at such valve by being secured to a pipe entering such valve adjacent to the valve.

3. The heater of claim 1, wherein the heater body is disposed at such valve by being secured directly to such valve.

4. The heater of claim 1, wherein the coolant conduit is serpentine.

5. The heater of claim 1, wherein the coolant conduit widens within the heater body to from a cavity.

6. The heater of claim 1, wherein the coolant conduit divides shortly after entrance of coolant into the heater body, and reunites shortly before exit of the coolant from the heater body.

7. The heater of claim 1, further comprising:
   5) first and second couplings at the second and third ends of the coolant lines, the first and second couplings being dimensioned and configured to operatively connect respectively to the inlet and outlet.

8. The heater of claim 7, further comprising:
   6) a bypass valve having first and second positions, the first position allowing flow of coolant directly from the second end to the third end, the second position preventing flow of coolant directly from the second end to the third end.

9. The heater of claim 1, wherein the material of the heater is one member selected from the group consisting of: steel, aluminum, polymer, and combinations thereof.

10. The heater of claim 1, further comprising:
   7) disposed on the surface of the conduit a coolant resistant material comprising one member selected from the group consisting of: a sleeve, an insert, a coating, a treated portion of the heater body, and combinations thereof.

11. The heater of claim 1, used on a generally cylindrical valve, wherein:
   8) the heater body is generally cylindrical and hollow, having a diameter greater than such cylindrical valve, 9) the heater body being disposed about the cylindrical valve, and 10) each end of the heater body is closed by means of a generally circular plate having a hole through which the generally cylindrical valve passes, wherein the hole is the same shape and dimension as the exterior surface of the generally cylindrical valve.

12. A water tank scrubber heater for use upon a water cooled vehicle engine, the heater comprising:

1) a first coolant line having first and second ends, the first end being operatively connected to such vehicle engine by which means coolant may pass between such vehicle engine and such first coolant line;

2) a second coolant line having third and fourth ends, the fourth end being operatively connected to such vehicle engine by which means coolant may pass between such vehicle engine and such second coolant line;

3) a heater body disposed at such scrubber, 4) the heater body having a coolant conduit therethrough, the coolant conduit having an inlet and an outlet in operative connection with each other, the second end and third end being operatively connected to such heater body respectively at the inlet and outlet, by which means coolant may pass between the first and second coolant lines.

13. A method of thawing frozen water valves on water tank vehicles and water tanks served by vehicles, the method comprising the steps of:

1) heating engine coolant in an engine, 2) passing the coolant through a heater body disposed upon a water valve.

* * * * *